United States Patent
Sander et al.

(10) Patent No.: US 10,693,914 B2
(45) Date of Patent: Jun. 23, 2020

(54) ALERTS FOR COMMUNITIES OF A SECURITY INFORMATION SHARING PLATFORM

(71) Applicant: ENTIT Software LLC, Sunnyvale, CA (US)

(72) Inventors: Tomas Sander, Princeton, NJ (US); Nadav Cohen, Sunnyvale, CA (US); Brian Frederik Hosea Che Hein, Aliso Viejo, CA (US); Ted Ross, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 106 days.

(21) Appl. No.: 15/737,878

(22) PCT Filed: Jun. 26, 2015

(86) PCT No.: PCT/US2015/038139
§ 371 (c)(1),
(2) Date: Dec. 19, 2017

(87) PCT Pub. No.: WO2016/209291
PCT Pub. Date: Dec. 29, 2016

(65) Prior Publication Data
US 2018/0234458 A1 Aug. 16, 2018

(51) Int. Cl.
*H04L 29/06* (2006.01)
*H04L 12/24* (2006.01)
*H04L 12/26* (2006.01)

(52) U.S. Cl.
CPC .............. *H04L 63/20* (2013.01); *H04L 29/06* (2013.01); *H04L 41/00* (2013.01); *H04L 41/06* (2013.01); *H04L 43/06* (2013.01); *H04L 63/1408* (2013.01)

(58) Field of Classification Search
CPC ......... H04L 63/20; H04L 43/06; H04L 41/06; H04L 63/1408; H04L 41/00; H04L 29/06
See application file for complete search history.

(56) References Cited

U.S. PATENT DOCUMENTS 6,807,569 B1  10/2004  Bhimani et al.
7,861,299 B1  12/2010  Tidwell et al.
(Continued)

OTHER PUBLICATIONS

Enisa, "Detect, Share, Protect Solutions for Improving Threat Data Exchange Among Certs", Oct. 2013, European Union Agency for Network and Information Security, 51 pages.*
(Continued)

*Primary Examiner* — Christopher A Revak (57) ABSTRACT

Examples disclosed herein relate to alerts for communities of a security information sharing platform. Some examples may enable obtaining a security indicator from a user of a first community of a security information sharing platform that enables sharing of security information among a plurality of communities; including the security indicator in community-based security information associated with the first community, the first security indicator comprising a first observable; sharing the first security indicator with the security information sharing platform; obtaining, from the security information sharing platform, information related to sightings of the first observable; and providing a first alert to the first community based on the information related to the sightings of the first observable.

19 Claims, 5 Drawing Sheets

(56) References Cited

U.S. PATENT DOCUMENTS

| | | | |
|---|---|---|---|
| 8,220,056 | B2 | 7/2012 | Owens |
| 8,239,668 | B1 | 8/2012 | Chen et al. |
| 8,281,370 | B2 | 10/2012 | Robbins et al. |
| 8,464,335 | B1 | 6/2013 | Sinha et al. |
| 8,607,353 | B2 | 12/2013 | Rippert et al. |
| 8,649,515 | B1 | 2/2014 | Zhao et al. |
| 9,143,892 | B2 | 9/2015 | Kuehnel |
| 9,342,796 | B1 * | 5/2016 | McClintock ........... G06N 20/00 |
| 9,537,889 | B2 | 1/2017 | Kuehnel |
| 2005/0018618 | A1 | 1/2005 | Mualem et al. |
| 2005/0251675 | A1 | 11/2005 | Marchan et al. |
| 2007/0106551 | A1 | 5/2007 | McGucken |
| 2008/0256359 | A1 | 10/2008 | Kahn et al. |
| 2012/0011077 | A1 | 1/2012 | Bhagat |
| 2012/0110633 | A1 | 5/2012 | An et al. |
| 2012/0246730 | A1 | 9/2012 | Raad |
| 2012/0278101 | A1 | 11/2012 | Homchowdhury et al. |
| 2013/0144879 | A1 * | 6/2013 | Kuehnel ................. H04L 47/34 707/736 |
| 2013/0179948 | A1 | 7/2013 | Ho et al. |
| 2013/0254880 | A1 * | 9/2013 | Alperovitch ............ G06F 21/51 726/22 |
| 2015/0381637 | A1 * | 12/2015 | Raff .................... H04L 63/0218 726/23 |
| 2017/0102933 | A1 * | 4/2017 | Vora .......................... G06F 8/65 |
| 2017/0187742 | A1 * | 6/2017 | Rogers ............... H04L 63/1433 |
| 2017/0264619 | A1 * | 9/2017 | Narayanaswamy .. H04L 63/104 |
| 2018/0103054 | A1 * | 4/2018 | Cran ................... H04L 63/1433 |
| 2018/0137275 | A1 * | 5/2018 | Ekambaram .......... G06F 21/556 |
| 2018/0198813 | A1 * | 7/2018 | Grubb ................ H04L 63/1433 |
| 2018/0232526 | A1 * | 8/2018 | Reid ..................... H04L 9/3239 |
| 2018/0234458 | A1 | 8/2018 | Sander |
| 2018/0359232 | A1 * | 12/2018 | Sander ................ H04L 63/0428 |

OTHER PUBLICATIONS

"Internet Identity, IID Launches Activetrust Cyber Threat Sharing and Collaboration Network", Feb. 11, 2014, 3 pages.*

Threatconnect, "Community Collaboration Enables Threat Detection", Jan. 9, 2014, 4 pages.*

Barnum, S., Cyber Observables and Integration with EMAP, EMAP 2011 Developers Days, U.S. Homeland Security, Aug. 2011, 31 pages.

Barnum, S., STIX—Structured Threat Information Expression, MITRE, Feb. 2014, 28 pages.

Berkeley, A.R., et al., Intelligence Information Sharing, Jan. 10, 2012, National Infrastructure Advisory Council, 228 pages.

International Search Report & Written Opinion, PCT Patent Application No. PCT/US2015/038129, dated Mar. 25, 2016, 10 pages.

Kesan, J.P., et al., Creating a 'Circle of Trust' to Further Digital Privacy and Cybersecurity Goals, Aug. 18, 2014, Michigan State Law Review, 86 pages.

Unknown, TAXII—An Overview, The MITRE Corporation, Jul. 2013, 32 pages.

International Searching Authority., International Search Report and Written Opinion dated Apr. 25, 2016 for PCT Application No. PCT/US2015/038139 Filed Jun. 26, 2015, 13 pgs.

Sandhu et al., "RT-Based Administrative Models for Community Cyber Security Information Sharing," 2011, 6 pages total.

* cited by examiner

ALERTS FOR COMMUNITIES OF A SECURITY INFORMATION SHARING PLATFORM

BACKGROUND

Users of a security information sharing platform share security indicators, security alerts, and/or other security-related information (e.g., mitigations strategies, attackers, attack campaigns, and trends, threat intelligence information, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

A "security indicator," as used herein, may refer to a detection guidance for a security threat and/or vulnerability. In other words, the security indicator may specify what to detect or look for (e.g., an observable) and what it means if detected. For example, the security indicator may specify a certain Internet Protocol (IP) address to look for in the network traffic. The security indicator may include the information that the detection of that IP address in the network traffic can indicate a certain malicious security threat such as a Trojan virus.

Users of a security information sharing platform share security indicators, security alerts, and/or other information (e.g., mitigations strategies, attackers, attack campaigns and trends, threat intelligence information, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

In some instances, a community (and/or users thereof) may want to be informed of the latest developments or trends regarding a particular security indicator that was submitted to the community. For example, the community such as a financial institution may want to share the security indicator with the security information sharing platform (e.g., the security indicator may be visible to a system administrator of the platform) to receive any alerts and/or information about the security indicator that are being shared by other communities or other financial institutions. However, that community may not want to share its security indicator with the users of other communities because the community may not want to disclose to the other financial institutions and the finance industry that it is under threat of security attacks.

Examples disclosed herein provide technical solutions to these technical challenges by effectively communicating an alert to a community using a security information sharing platform. Some examples may enable obtaining a security indicator from a user of a first community of a security information sharing platform that enables sharing of security information among a plurality of communities; including the security indicator in community-based security information associated with the first community, the first security indicator comprising a first observable; sharing the first security indicator with the security information sharing platform; obtaining, from the security information sharing platform, information related to sightings of the first observable; and providing a first alert to the first community based on the information related to the sightings of the first observable.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or, system. The term "and/or" as used, herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
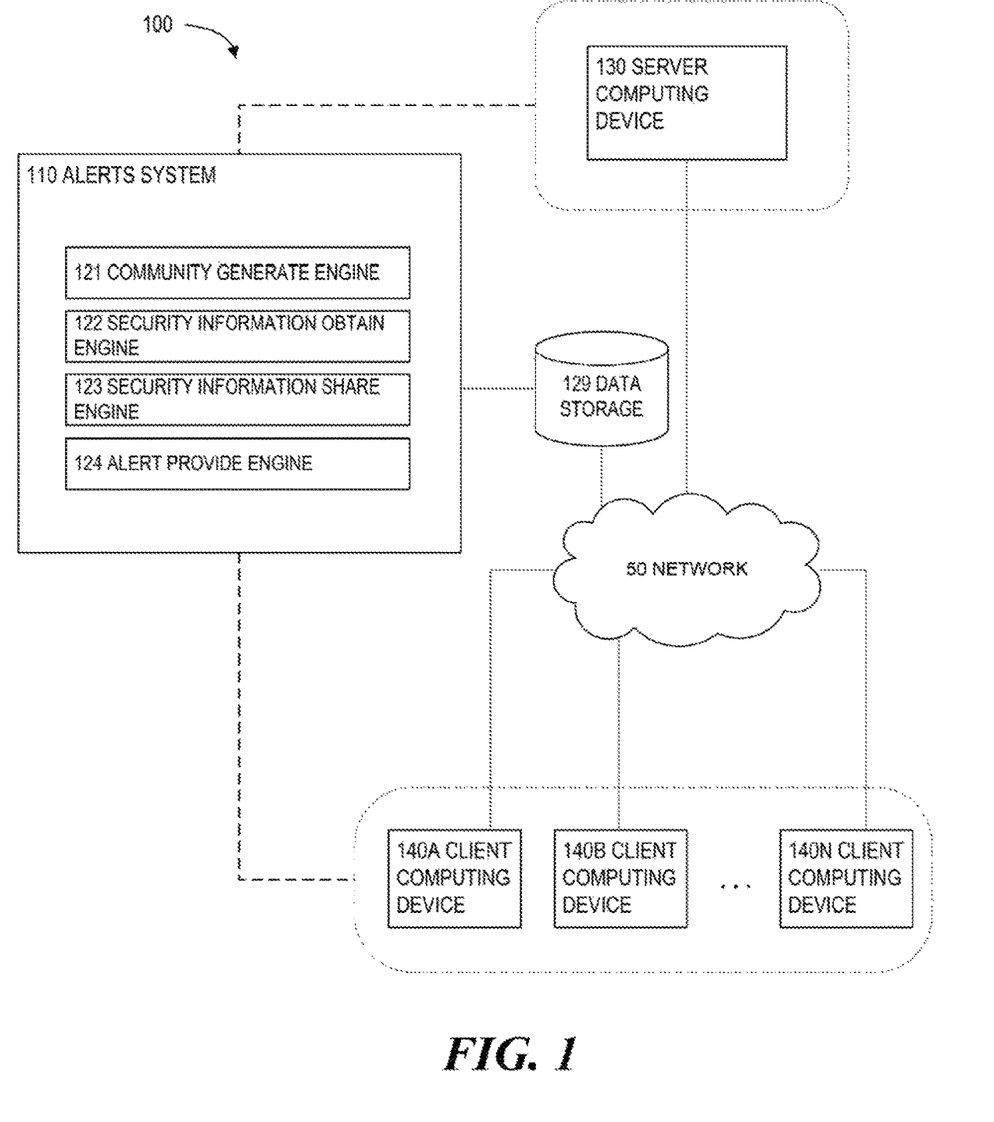
FIG. 1 is a block diagram depicting an example environment in which various examples may be implemented as an alerts system.

FIG. 1 is an example environment 100 in which various examples may be implemented as a alerts system 110. Environment 100 may include various components including server computing device 130 and client computing devices 140 (illustrated as 140A, 140B, ..., 140N). Each client computing device 140A, 140B, ..., 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing, device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, alerts system 110 and the various components described herein may be implemented in hardware and/or a combination of hardware and programming that configures hardware. Furthermore, in FIG. 1 and other Figures described herein, different numbers of components or entities than depicted may be used.

Alerts system 110 may comprise a community generate engine 121, a security information obtain engine 122, a security information share engine 123, an alert provide engine 124, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Community generate engine 121 may generate a community on a security information sharing platform. The security information sharing platform, as discussed above, may enable sharing of security information among a plurality of communities. The community may comprise a plurality of users. The generation of the community may be user-initiated or system-initiated. For example, a user may create the community by providing a list of users to be included in the community. In another example, the security information sharing platform may automatically identify and/or invite users who might be interested in joining the community based on information that have been collected about users of the platform (e.g., the platform may automatically identify and/or invite users who have been under similar security threats in the past).

Security information obtain engine 122 may obtain a security indicator for the community (e.g., generated by community generate engine 121 as discussed herein). The security indicator may comprise at least one observable. A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address a domain name, an e-mail address, Uniform Resource Locator (URL), and a software file hash. A security indicator may comprise a single observable (e.g., "a new file is created by an executable") or a plurality of observables (e.g., "a new file created by an executable" and "the executable connects to domain X").

A security indicator may be created by and/or originated from at least one of a plurality of source entities. For example, the plurality of source entities may include a user. A security indicator may be manually created and/or added to the security information sharing platform by the user. In another example, the plurality of source entities may include a threat intelligence provider that provides threat intelligence feeds. A security indicator that is found in the intelligence feeds, for example, may be created and/or added to the security information sharing platform. There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria.

"Contextual information" related to a security indicator, as used herein, may comprise information about: an investigation result that is provided by a user of the community, an indicator score for the security indicator, a source entity for the security indicator, a threat actor (e.g., attacker) for the security indicator, a level of confidence (e.g., the level of confidence that the indicator is actually malicious), a level of severity (e.g., the level of severity or likely impact that the indicator may pose), a sighting of an observable of the security indicator, and/or other information related to the security indicator. In some implementations, the contextual information may include information specific to the community itself such as an industry sector (e.g., the industry sector that the community is in), a geography (e.g., a geographical region where the community is located in), a common interest area, and/or other information related to the community.

In some implementations, security information obtain engine 122 may obtain a security indicator for the community and/or include the security indicator (and/or contextual information related to the security indicator) in the community-based security information of that community. The "community-based security information," as used herein, may refer to any security indicators, contextual information (related to those security indicators, the community, etc.), or any other information originated from (and/or submitted to the community) by a user of that community. For example, a user of the community may create and/or submit the security indicator to the community using the security information sharing platform. The user when creating the security indicator may specify some contextual information related to the security indicator such as a level of confidence associated with the security indicator (e.g., the level of confidence that the indicator is actually malicious) and/or a level of severity (e.g., likely impact) associated with the security indicator (e.g., the level of severity or likely impact that the indicator may pose) and/or other information the user is aware of about the security indicator.

In some implementations, security information obtain engine 122 may provide the security indicator to the community to obtain additional contextual information about the security indicator from the users of the community. For example, a user of the community may create a new security indicator using the security information sharing platform and/or submit it to the community so that other users of the community may collaboratively investigate the security indicator and provide their input. In doing so, security information obtain engine 122 may present, via a user interface (e.g., of the security information sharing platform), the security indicator to the users of the community. A user of the community may investigate the security indicator being presented, assess the reliability of the source entity of the indicator, the level of confidence, and/or the level of severity, report a sighting of an observable (e.g., a sighting indicating that the user observed the observable), provide information about a potential threat actor (e.g., attacker) behind the security indicator, etc. The security indicator along with any associated contextual information may be included and/or stored as part of the community-based security information of that community.

Security information share engine 123 may share the security indicator of the community (and/or at least a portion of the community-based security information of the community) with the security information sharing platform. The community may choose to keep the security indicator (and/or associated contextual information) private within the community or selectively share the security indicator (and/or associated contextual information) with the security sharing platform, another community, and/or another user. The community-based security information that is kept private within the community may be accessed by the users who belong, to that community but may not be accessible by or visible to the security information sharing platform, another community, and/or another user. "Access," as used herein, may refer to an ability to view/read, modify, delete, or any combination thereof.

In one example, the community may selectively share at least a portion of the community-based security information with the security information sharing platform where the security information sharing platform (e.g., a system administrator of the platform) may have access to the shared portion but no other communities have access to the shared portion. This may be useful, for example, when a particular financial institution wants to obtain information regarding its security indicator (e.g., the information shared by other communities regarding that security indicator) from the security information sharing platform but does not want to disclose that the particular financial institution might be under threat of such security indicator to other communities. In this example, the community may choose to share its security indicator while contextual information about whether the attack or threat identified in the indicator was indeed successful can be kept private within the community.

In another example, the community may selectively share at least a portion of the community-based security information with a user of another community. In doing so, the community may specify an identification of users and/or communities with whom the security information is being shared and/or characteristic of users and/or communities (e.g., industry, geography, interest area, etc.) with whom the security information should be shared.

Note that a particular user of the community may have access to: the community-based security information of the community and the community-based security information of other communities being shared with the community (or with the particular user). In addition, there may be security information stored on the security information sharing platform that do not belong to any communities. That information may be public and therefore accessible by all of the users of the platform regardless of which community individual users belong to.

Alert provide engine 124 may provide an alert to the community regarding the shared security indicator (e.g., shared by security information share engine 123). Note that the community may be prevented from obtaining the alert unless its security indicator is shared with the security information sharing platform. An "alert," as used herein, may include or otherwise provide any information (e.g., contextual information for the observable, the indicator, the community, etc.) submitted to the security information sharing platform regarding the security indicator. For example, the alert may provide any contextual information submitted to the platform by a user of another community regarding the security indicator and/or any contextual information submitted to the platform by a threat intelligence provider regarding the security indicator.

In some implementations, alert provide engine 124 may provide an alert to the community based on information related to sightings of at least one observable of the shared security indicator. When more than a certain number of sightings of the observable have been reported to the security information sharing platform, the contextual information related to that observable may be deemed reliable such that the community may be interested in receiving that information. Note that any reliability-based criteria other than the sightings may be used to determine whether to provide an alert.

In some implementations, the security information sharing platform may keep track of information related to sightings of an observable. The platform may obtain from a source entity, a sighting of an observable. The sighting of the observable may indicate that the observable has been observed by the source entity. For example, the source entity (e.g., the examples of the source entity are discussed herein with respect to security indicator obtain engine 122) may detect a certain IP address (e.g., the observable) in its network traffic, and add the observable to the security information sharing platform. This addition of the observable may be considered as a single sighting of the observable. In some instances, when two individuals working for the same organization add the same observable to the platform, the platform may treat these additions as a single sighting of the observable or as two separate sightings of the observable. In another example, when the IP address (e.g., the observable) is found in the threat intelligence feeds provided by a particular threat intelligence provider, this observable may be added to the security information sharing platform as a single sighting of this observable. When two different sets of threat intelligence feeds provided by two different providers include the same observable, the observable may be added as two sightings of the observable.

For example, a first community may be interested in learning about what other communities and/or threat intelligence providers learned about an IP address (e.g., an observable) that has been submitted to the first community as part of a security indicator. When the IP address is observed by a user of a second community, the user may report this sighting of the IP address to the security information sharing platform. When the IP address is observed again by a user of a third community that user may also report this sighting of the IP address to the platform. In some instances, a threat intelligence provider may provide threat intelligence feeds including this particular IP address to the platform.

Alert provide engine 124 may determine a number (e.g., count) of sightings of the observable. In other words, it may determine the number of times that the observable has been observed by at least one source entity. For example, alert provide engine 124 may obtain, from a first source entity, a first sighting of the observable that indicates that the observable has been observed by the first source entity. Alert provide engine 124 may obtain, from a second source entity, a second sighting of the observable that indicates that the observable has been observed by the second source entity. In this case, the number of sightings of this observable may be 2. Note that the same observable may be associated with more than one security indicator. For example, a certain IP address may be part of a first security indicator (e.g., a finding of this IP address indicates a Trojan virus) as well as a second security indicator (e.g., a finding of this IP address visiting a particular URL indicates a Trojan virus). As such, a single sighting of the observable may be counted as one sighting for each of the first security indicator and the second security indicator.

Returning back to the example above, there may be a total of 3 sightings of the IP address. In some implementations, alert provide engine 124 may determine whether the number of sightings of the IP address exceeds a threshold value. If the threshold value has been predetermined to be 2, for example, alert provide engine 124 may generate an alert in response to determining that the number of sightings (e.g., a total of 3 sightings) exceeds threshold value.

In some implementations, alert provide engine 124 may provide an alert to the community based on information related to other security indicators that may be linked to the shared security indicator although the other security indicators exist outside of the community. For example, the community having a first security indicator may be interested in knowing about a second security indicator that has similar contextual information as the first security indicator does. If there is the second security indicator with the same threat actor, the community may be interested in being alerted about the latest development or trends of the second security indicator. In doing so, alert provide engine 124 may determine whether first contextual information associated with the first security indicator has at least a portion that overlaps with second contextual information associated with the second security indicator, hi response to determining that there is an overlap (e.g., a common threat actor, industry sector, etc.), alert provide engine 124 may provide an alert to the community about the second security indicator using the second contextual information.

In performing their respective functions, engines 121-124 may access data storage 129 and/or other suitable database (s). Data storage 129 may represent any memory accessible to alerts system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Alerts system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
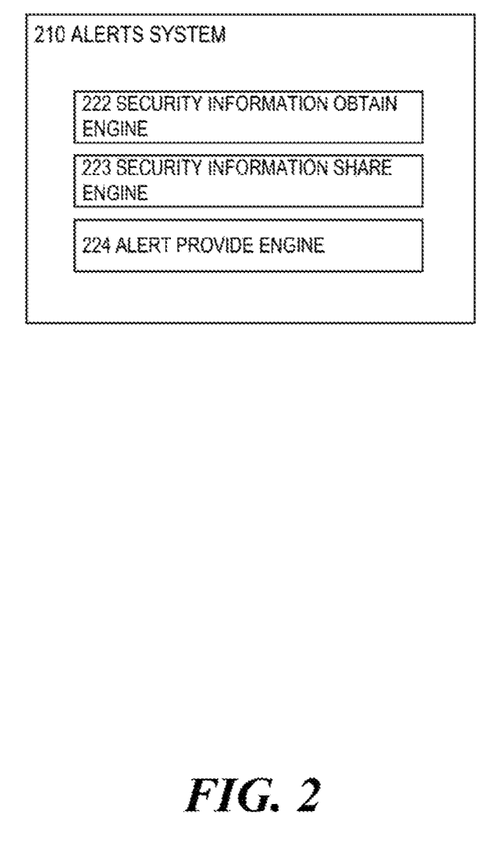
FIG. 2 is a block diagram depicting an example alerts system.

FIG. 2 is a block diagram depicting an example alerts system 210. Alerts system 210 may comprise a security information obtain engine 222, a security, information share engine 223, an alert provide engine 224, and/or other engines. Engines 222-224 represent engines 122-124, respectively.

Figure 3:
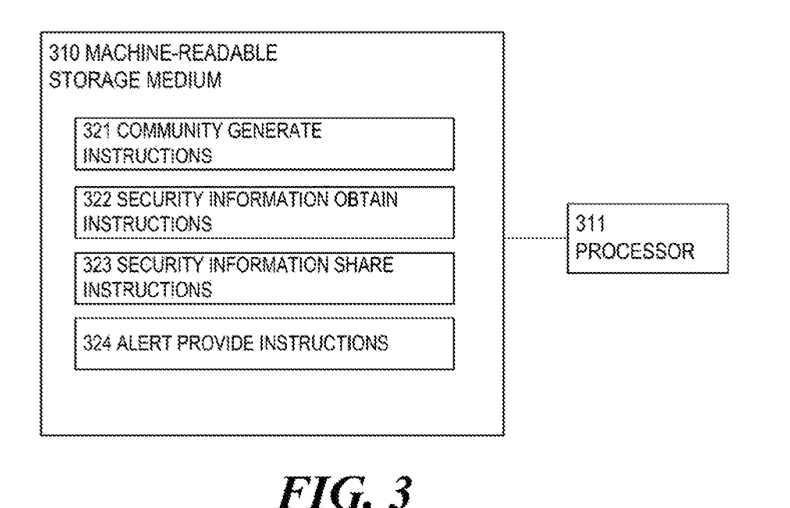
FIG. 3 is a block diagram depicting an example machine-readable storage medium comprising instructions executable by a processor for providing alerts for communities of a security information sharing platform.

FIG. 3 is a block diagram depicting an example machine-readable storage medium 310 comprising instructions executable by a processor for providing alerts for communities of a security information sharing platform.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements alerts system 110 of FIG. 1.

In FIG. 3, the executable program instructions in machine-readable storage medium 310 are depicted as community generate instructions 321, security information obtain instructions 322 security information share instructions 323, and alert provide instructions 324. Instructions 321-324 represent program instructions that, when executed, cause processor 311 to implement engines 121-124, respectively.

Figure 4:
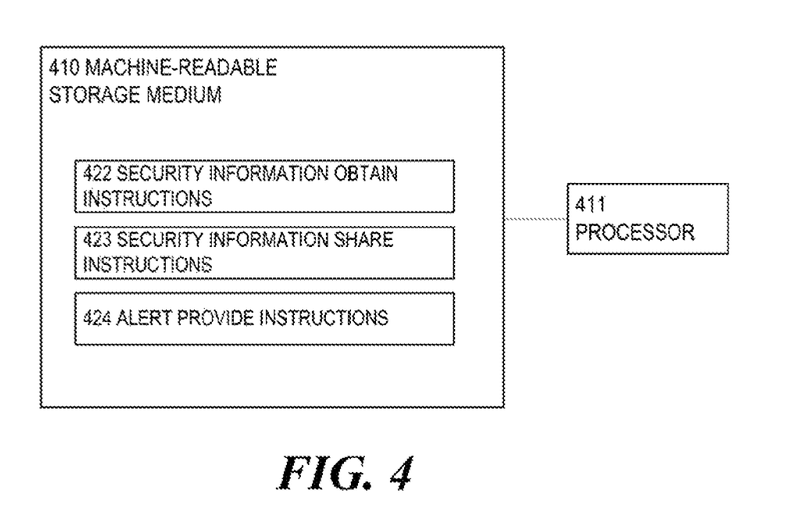
FIG. 4 is a block diagram depicting an example machine-readable storage medium comprising instructions executable by a processor for providing alerts for communities of a security information sharing platform.

FIG. 4 is a block diagram depicting an example machine-readable storage medium 410 comprising instructions executable by a processor for providing alerts for communities of a security information sharing platform.

Referring to FIG. 4, the programming may be processor executable instructions 422-424 stored on a machine-readable storage medium 410 and the hardware may include a processor 411 for executing those instructions. Thus, machine-readable storage medium 410 can be said to store program instructions or code that when executed by processor 411 implements alerts system 110 of FIG. 1.

In FIG. 4, the executable program instructions in machine-readable storage medium 410 are depicted as security information obtain instructions 422, security information share instructions 423, and alert provide instructions 424. Instructions 422-424 represent program instructions that, when executed, cause processor 411 to implement engines 122-124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement alerts system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 422-424, and/or other instructions. As an alternative or in addition to retrieving and executing instructions, processor 411 may include at least one electronic circuit comprising a number of electronic components for performing the functionality of at least one of instructions 422-424, and/or other instructions.

Figure 5:
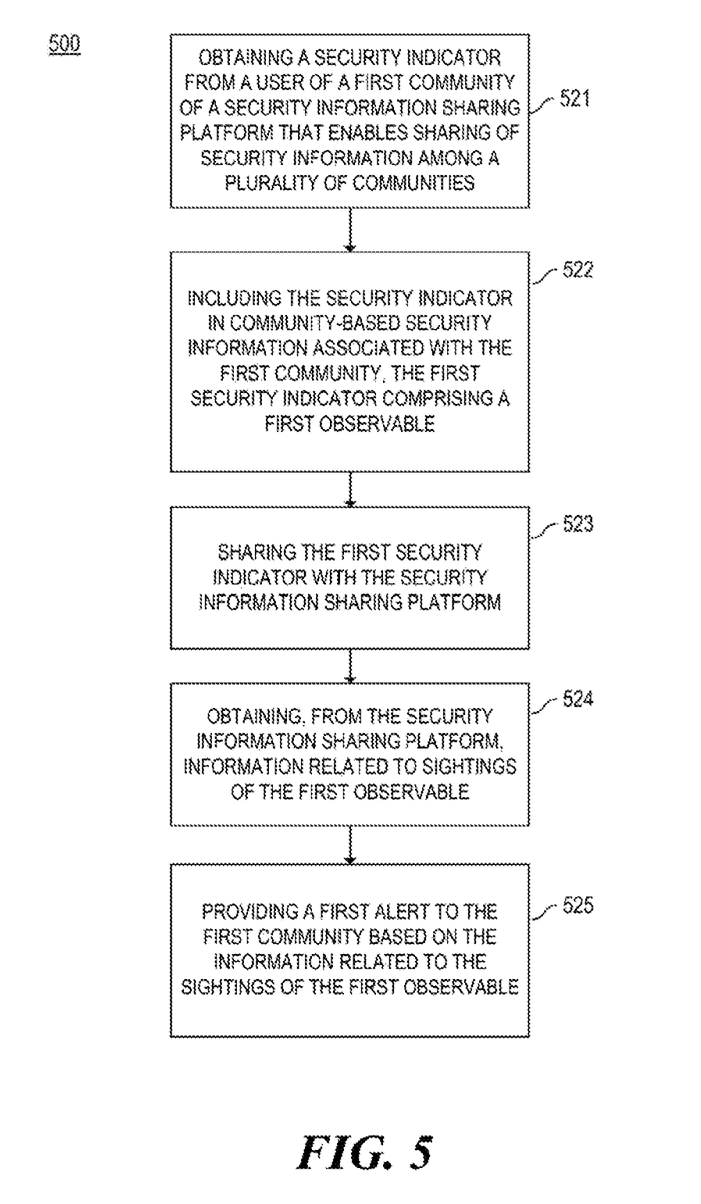
FIG. 5 is a flow diagram depicting an example method for providing alerts for communities of a security information sharing platform.

FIG. 5 is a flow diagram depicting an example method 500 for providing alerts for communities of a security information sharing platform. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining a security indicator from a user of a first, community of a security information sharing platform that enables sharing of security information among a plurality of communities. Referring back to FIG. 1, security information obtain engine 122 may be responsible for implementing block 521.

In block 522, method 500 may include including the security indicator in community-based security information associated with the first community, the first security indicator comprising a first observable. Referring back to FIG. 1, security information obtain engine 122 may be responsible for implementing block 522.

In block 523, method 500 may include sharing the first security indicator with the security information sharing platform. Referring back to FIG. 1, security information share, engine 123 may be responsible for implementing block 523.

In block 524, method 500 may include obtaining, from the security information sharing platform, information related to sightings of the first observable. Referring back to FIG. 1, alert provide engine 124 may be responsible for implementing block 524.

In block 525, method 500 may include providing a first alert to the first community based on the information related to the sightings of the first observable. Referring back to FIG. 1, alert provide engine 124 may be responsible for implementing block 525.

Figure 6:
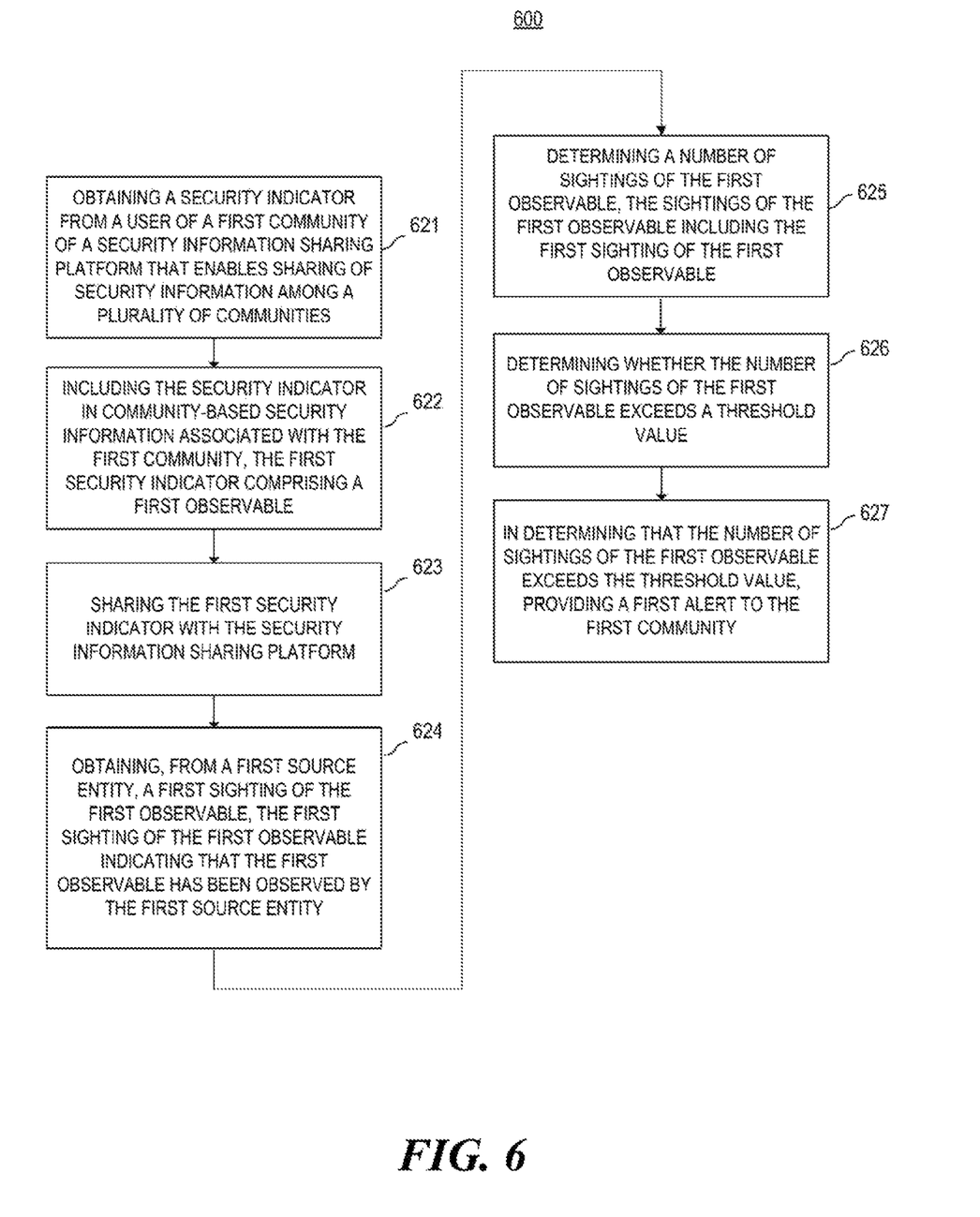
FIG. 6 is a flow diagram depicting an example method for providing alerts for communities of a security information sharing platform.

FIG. 6 is a flow diagram depicting an example method 600 for providing alerts for communities of a security information sharing platform. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include obtaining a security indicator from a user of a first community of a security information sharing platform that enables sharing of security information among a plurality of communities. Referring back to FIG. 1, security information obtain engine 122 may be responsible for implementing block 621.

In block 622, method 600 may include, including the security indicator in community-based security information associated with the first community, the first security indicator comprising a first observable. Referring back to FIG. 1, security information obtain engine 122 may be responsible for implementing block 622.

In block 623, method 600 may include sharing the first security indicator with the security information sharing platform. Referring back to FIG. 1, security information share engine 123 may be responsible for implementing block 623.

In block 624, method 600 may include obtaining, from a first source entity, a first sighting of the first observable, the first sighting of the first observable indicating that the first observable has been observed by the first source entity. Referring back to FIG. 1, alert provide engine 124 may be responsible for implementing block 624.

In block 625, method 600 may include determining a number of sightings of the first observable, the sightings of the first observable including the first sighting of the first observable. Referring back to FIG. 1, alert provide engine 124 may be responsible for implementing block 625.

In block 626, method 600 may include determining whether the number of sightings of the first observable exceeds a threshold value. Referring back to FIG. 1, alert provide engine 124 may be responsible for implementing block 626.

In block 627, method 600 may include providing a first alert to the first community in response to determining that the number of sightings exceeds the threshold value. Referring back to FIG. 1, alert provide engine 124 may be responsible for implementing block 627.

The foregoing disclosure describes a number of example implementations for alerts for communities of a security information snaring platform. The disclosed examples may include systems, devices, computer-readable storage media, and methods for providing alerts for communities of a security information sharing platform. For purposes of explanation, certain examples are described with reference to the components illustrated in FIGS. 1-4. The functionality of the illustrated components may overlap, however, and may be present, in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations, and modifications may be made to the described examples. All such modifications and variations are intended to be included within the scope of this disclosure and protected by the following claims.

The invention claimed is:

1. A method for providing alerts for communities of a security information sharing platform, the method comprising:

obtaining a first security indicator from a user of a first community of the security information sharing platform that enables sharing of security information among a plurality of communities, wherein each of the plurality of communities is a defined group of users that share a particular set of security information;

including the first security indicator in community-based security information associated with the first community, the first security indicator comprising a first observable;

sharing a first portion of the first security indicator with a second community of the security information sharing platform, wherein a second portion of the first security indicator is kept private to the first community of the security information sharing platform;

obtaining, from the security information sharing platform, information related to sightings of the first observable; and providing a first alert to the first community based on the information related to the sightings of the first observable.

2. The method of claim 1, wherein obtaining the information related to the sightings of the first observable further comprises:

obtaining, from a first source entity, a first sighting of the first observable, the first sighting of the first observable indicating that the first observable has been observed by the first source entity; and determining a number of sightings of the first observable, the sightings of the first observable including the first sighting of the first observable.

3. The method of claim 2, wherein the first source entity comprises a second user of the second community.

4. The method of claim 2, further comprising:

obtaining, from a second source entity, a second sighting of the first observable, the second sighting of the first observable indicating that the first observable has been observed by the second source entity; and determining the number of sightings of the first observable, the sightings of the first observable including the second sighting of the first observable.

5. The method of claim 2, wherein providing the first alert to the first community based on the information related to the sightings of the first observable further comprises:

determining whether the number of sightings of the first observable exceeds a threshold value; and in response to determining that the number of sightings of the first observable exceeds the threshold value, generating the first alert.

6. The method of claim 1, wherein the first security indicator comprises a second observable, further comprising:

obtaining, from the security information sharing platform, information related to sightings of the second observable; and providing a second alert to the first community based on the information related to the sightings of the second observable.

7. The method of claim 1, wherein the first community is prevented from obtaining the first alert unless the first security indicator is shared with the security information sharing platform.

8. The method of claim 1, wherein the plurality of communities other than the first community are prevented from accessing the first security indicator unless the first security indicator is also shared with the plurality of communities.

9. The method of claim 1, the first security indicator associated with first contextual information, the method comprising:

sharing a first portion of the first contextual information with the second community, wherein a second portion of the first contextual information is kept private to the first community.

10. The method of claim 9, wherein the first contextual information indicates an industry sector associated with the first community.

11. A non-transitory machine-readable storage medium comprising instructions executable by a processor of a computing device for providing alerts for communities of a security information sharing platform, the machine-readable storage medium comprising:

instructions to obtain a first security indicator from a first user of a first community generated on the security information sharing platform that enables sharing of security information among a plurality of communities, wherein each of the plurality of communities is a defined group of users that share a particular set of security information;

instructions to include the first security indicator in community-based security information associated with the first community, the first security indicator comprising an observable;

instructions to share a first portion of the first security indicator with a second community of the security information sharing platform, wherein a second portion of the first security indicator is kept private to the first community of the security information sharing platform;

instructions to determine a number of sightings of the observable using information stored on the security information sharing platform, the number of sightings indicating the number of times that the observable has been observed by at least one source entity; and instructions to provide a first alert to the first community based on the number of sightings of the observable.

12. The non-transitory machine-readable storage medium of claim 11, further comprising:

instructions to identify contextual information related to the first security indicator;

instructions to identify a second security indicator that is related to the identified contextual information; and instructions to provide a second alert to the first community based on information stored on the security information sharing platform with respect to the second security indicator.

13. The non-transitory machine-readable storage medium of claim 11, further comprising:

instructions to provide the first security indicator to the first community to obtain contextual information related to the first security indicator from a second user of the first community.

14. The non-transitory machine-readable storage medium of claim 13, wherein the contextual information is not shared with the security information sharing platform.

15. A system for providing alerts for communities of a security information sharing platform comprising:

a processor that:

obtains a first security indicator from a first user of a first community of the security information sharing platform that enables sharing of security information among a plurality of communities, the first security indicator associated with first contextual information, wherein each of the plurality of communities is a defined group of users that share a particular set of security information;

obtains a second security indicator from a second user of a second community of the security information sharing platform, the second security indicator associated with second contextual information;

shares a first portion of the first security indicator with the second community of the security information sharing platform, wherein a second portion of the first security indicator is kept private to the first community;

determines that the first contextual information has at least a portion that overlaps with the second contextual information; and provides an alert to the first community about the second security indicator using the second contextual information.

16. The system of claim 15, wherein the first or second contextual information comprise a threat actor, an industry sector, a geography, a sighting, or a combination thereof.

17. The system of claim 15, wherein the alert comprises at least a portion of the second contextual information.

18. The system of claim 15, wherein the first contextual information indicates an industry sector associated with the first community.

19. The system of claim 15, wherein the first contextual information indicates geographical area associated with the first community.

* * * * *